US010913536B2

(12) United States Patent
Mochizuki et al.

(10) Patent No.: US 10,913,536 B2
(45) Date of Patent: Feb. 9, 2021

(54) LINEAR MOVEMENT GUIDE DEVICE

(71) Applicant: THK CO., LTD., Tokyo (JP)

(72) Inventors: Hiroaki Mochizuki, Tokyo (JP); Eiji Hosaka, Tokyo (JP); Hiroomi Kuribayashi, Tokyo (JP); Toshiro Minami, Tokyo (JP); Akito Kaneko, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/469,419

(22) PCT Filed: Dec. 15, 2017

(86) PCT No.: PCT/JP2017/045079
§ 371 (c)(1),
(2) Date: Jun. 13, 2019

(87) PCT Pub. No.: WO2018/116976
PCT Pub. Date: Jun. 28, 2018

(65) Prior Publication Data
US 2019/0315473 A1 Oct. 17, 2019

(30) Foreign Application Priority Data

Dec. 20, 2016 (JP) .................................. 2016-247083

(51) Int. Cl.
*B60N 2/00* (2006.01)
*B64D 11/06* (2006.01)
*F16C 29/10* (2006.01)

(52) U.S. Cl.
CPC ...... *B64D 11/0696* (2013.01); *B64D 11/0648* (2014.12); *F16C 29/10* (2013.01)

(58) Field of Classification Search
CPC ........ B60N 2/0715; B60N 2/067; B60N 2/06; B60N 2/929; B60N 2/164; B60N 2/1853
(Continued)

(56) References Cited

U.S. PATENT DOCUMENTS 4,771,969 A * 9/1988 Dowd ................ B64D 11/0696
244/118.6
4,796,837 A * 1/1989 Dowd ................ B64D 11/0696
244/122 R
(Continued)

FOREIGN PATENT DOCUMENTS

GB 1007119 A 10/1965
JP 2001-001808 A 1/2001
(Continued)

OTHER PUBLICATIONS

International Search Report dated Mar. 20, 2018, issued in counterpart International Application No. PCT/JP2017/045079, with English Translation (5 pages).
(Continued)

*Primary Examiner* — Steven M Marsh
(74) *Attorney, Agent, or Firm* — Westerman, Hattori, Daniels & Adrian, LLP

(57) ABSTRACT

This linear movement guide device is provided with a track rail, a slider block attached to the track rail so as to be capable of movement relative thereto via a plurality of rolling bodies, and a position-determining pin which restricts the relative movement between the slider block and the track rail, wherein: the track rail is provided with a securing hole for securing the track rail to a base member, and a position-determining hole into which the position-determining pin is inserted; the slider block is provided with a rocker bearing part having an attachment hole into which a rocker shaft is inserted, and also provided with a connecting hole into which the position-determining pin is inserted; and the attachment hole and the connecting hole are each positioned in a location that avoids the center of the slider block in the lengthwise direction thereof.

5 Claims, 5 Drawing Sheets

(58) Field of Classification Search
USPC ............................. 248/424, 429, 503, 503.1
See application file for complete search history.

(56) References Cited

U.S. PATENT DOCUMENTS

| | | | | |
|---|---|---|---|---|
| 7,232,096 | B1 * | 6/2007 | Ahad ................. | B64D 11/0696 244/118.6 |
| 7,713,009 | B2 * | 5/2010 | Hudson .............. | B64D 11/0696 410/105 |
| 7,857,561 | B2 * | 12/2010 | Mejuhas ............ | B64D 11/0696 410/105 |
| 8,292,224 | B1 * | 10/2012 | Ahad ................. | B64D 11/0696 244/118.6 |
| 8,360,386 | B2 * | 1/2013 | Marechal ........... | B64D 11/0696 248/503.1 |
| 9,546,000 | B2 * | 1/2017 | Shih ................... | B64D 11/0696 |
| 2002/0033622 | A1 | 3/2002 | Jarnail et al. | |
| 2007/0063122 | A1 | 3/2007 | Bowd et al. | |
| 2009/0026827 | A1 | 1/2009 | Bishop | |

FOREIGN PATENT DOCUMENTS

| | | | |
|---|---|---|---|
| JP | 2002-160568 | A | 6/2002 |
| JP | 3660631 | B2 | 6/2005 |
| JP | 2009-502629 | A | 1/2009 |
| JP | 2009-29415 | A | 2/2009 |
| WO | 2016/181623 | A1 | 11/2016 |

OTHER PUBLICATIONS

Office Action dated Oct. 20, 2020, issued in counterpart JP Application No. 2016-247083, with English Translation. (10 pages).

\* cited by examiner

LINEAR MOVEMENT GUIDE DEVICE

TECHNICAL FIELD

The present invention relates to a linear movement guide device.

Priority is claimed on Japanese Patent Application No. 2016-247083, filed Dec. 20, 2016, the content of which is incorporated herein by reference.

BACKGROUND ART

Patent Literature 1 below discloses a mounting device which mounts a guided object such as a passenger seat on a base member laid on a floor surface so as to be displaceable. In the mounting device, the guided object can be repositioned relative to the base member in a longitudinal direction thereof and can be fixed to the base member.

CITATION LIST

Patent Literature

[Patent Literature 1] Japanese Patent No. 3660631

SUMMARY OF INVENTION

Technical Problem

In the above conventional mounting device, since a working time for changing a longitudinal position of a guided object and fixing the guided object to a base member again was relatively long, there has been a need to reduce the working time. In order to reduce the working time, it is conceivable to mount the guided object on the base member using a linear movement guide device including components such as track rails or the like.

Here, when mounting the guided object on the base member using the linear movement guide device, it is required to reduce the size of each member constituting the linear movement guide device. However, it may be difficult to ensure robustness so as to withstand a relatively large load caused by the passenger seat or the like while keeping the size of each member compact.

The present invention provides a linear movement guide device that can easily change a position of a guided object in the longitudinal direction and ensure robustness.

Solution to Problem

According to a first aspect of the present invention, a linear movement guide device includes a track rail, a movable body which is attached to the track rail so as to be capable of movement relative thereto via a plurality of rolling bodies, and a positioning pin which restricts the relative movement between the movable body and the track rail. The track rail is provided with a plurality of securing holes configured to fix the track rail to a base member, which are disposed at predetermined intervals in a longitudinal direction thereof, and a positioning hole into which the positioning pin is inserted. The movable body is provided with a rocker bearing part having an attachment hole into which a rocker shaft configured to rockably connect a guided object is inserted, and an insertion hole into which the positioning pin is inserted. The attachment hole and the insertion hole are disposed at positions that avoid a center of the movable body in the longitudinal direction.

According to a second aspect of the present invention, a length of the movable body in the longitudinal direction may be longer than a distance between central axes of the securing holes that are positioned at both ends in the longitudinal direction among three securing holes disposed in series.

A central axis of the insertion hole may be positioned between the securing holes adjacent to each other in the longitudinal direction.

According to a third aspect of the present invention, a central axis of the attachment hole may be positioned between the securing holes adjacent to each other in the longitudinal direction, which is different from being positioned between the securing holes where the central axis of the insertion hole is positioned.

According to a fourth aspect of the present invention, when viewed in a cross-sectional view perpendicular to the longitudinal direction, an internal space and a slit which communicates the internal space with the outside of the base member may be formed in the base member. The track rail may be attached to the base member via an inner attachment member disposed in the internal space.

According to a fifth aspect of the present invention, the rocker bearing part may be connected to a rear leg of a passenger seat for an aircraft via the rocker shaft.

Advantageous Effects of Invention

According to the linear movement guide device described above, it is possible to easily change the position of the guided object in the longitudinal direction, and it is possible to obtain a linear movement guide device that can ensure robustness.

DESCRIPTION OF EMBODIMENTS

Figure 1:
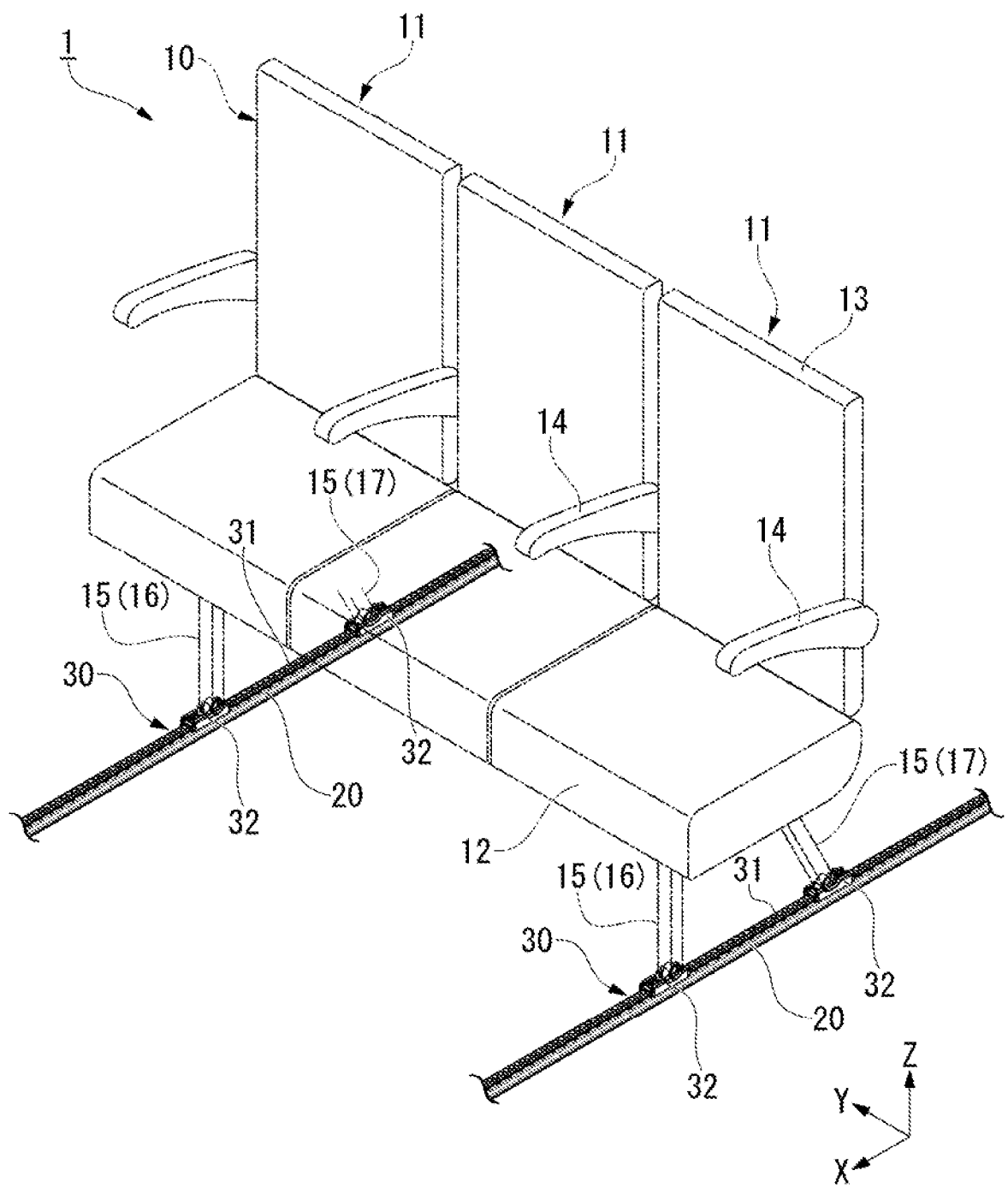
FIG. 1 is a perspective view showing a passenger seat moving and fixing device according to an embodiment of the present invention.

Hereinafter, embodiments of the present invention will be described with reference to the drawings. It should be understood that the embodiments shown below are described by way of example in order to better understand the gist of the present invention and do not limit the present invention unless otherwise specified. Also, in the drawings used for the following description, for the sake of easy understanding of features of the present invention, main parts may be enlarged for convenience. A dimensional proportion of each component is not necessarily the same as the actual one. In addition, in order to make the features of the present invention intelligible, some parts may be omitted for convenience.

Figure 2:
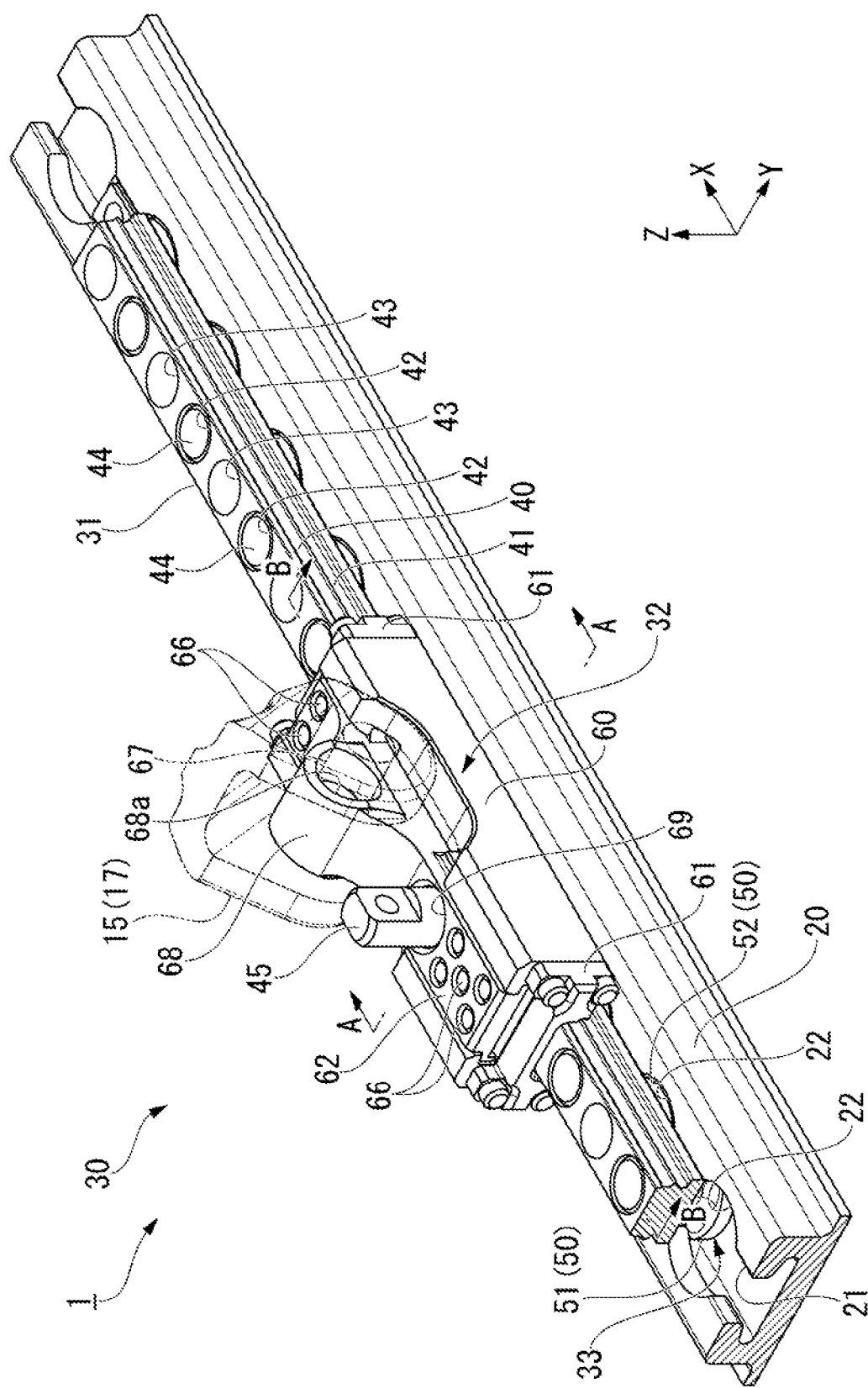
FIG. 2 is a perspective view showing a linear movement guide device provided in the passenger seat moving and fixing device shown in FIG. 1.
Figure 3:
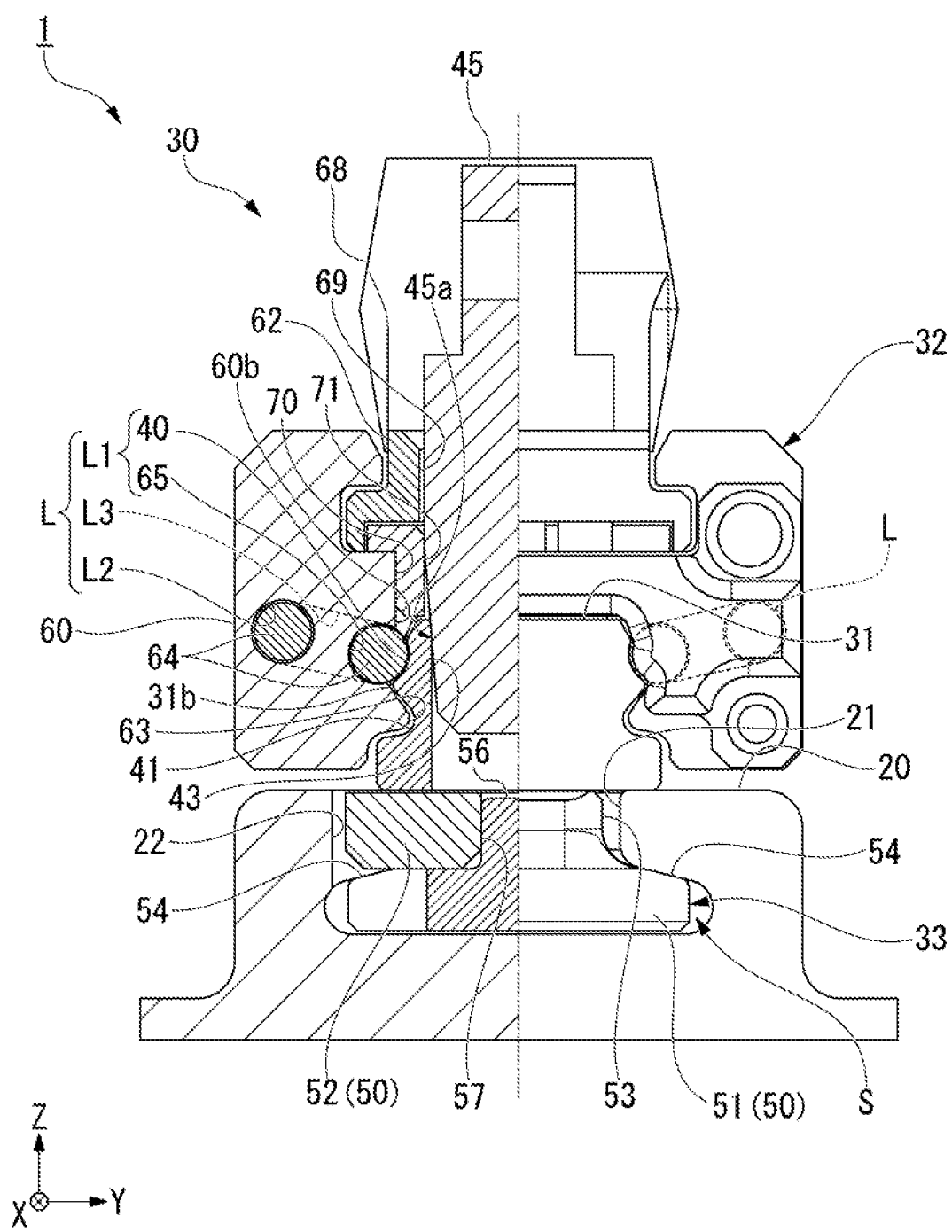
FIG. 3 is a partial cross-sectional view taken along line A-A shown in FIG. 2.
Figure 4:
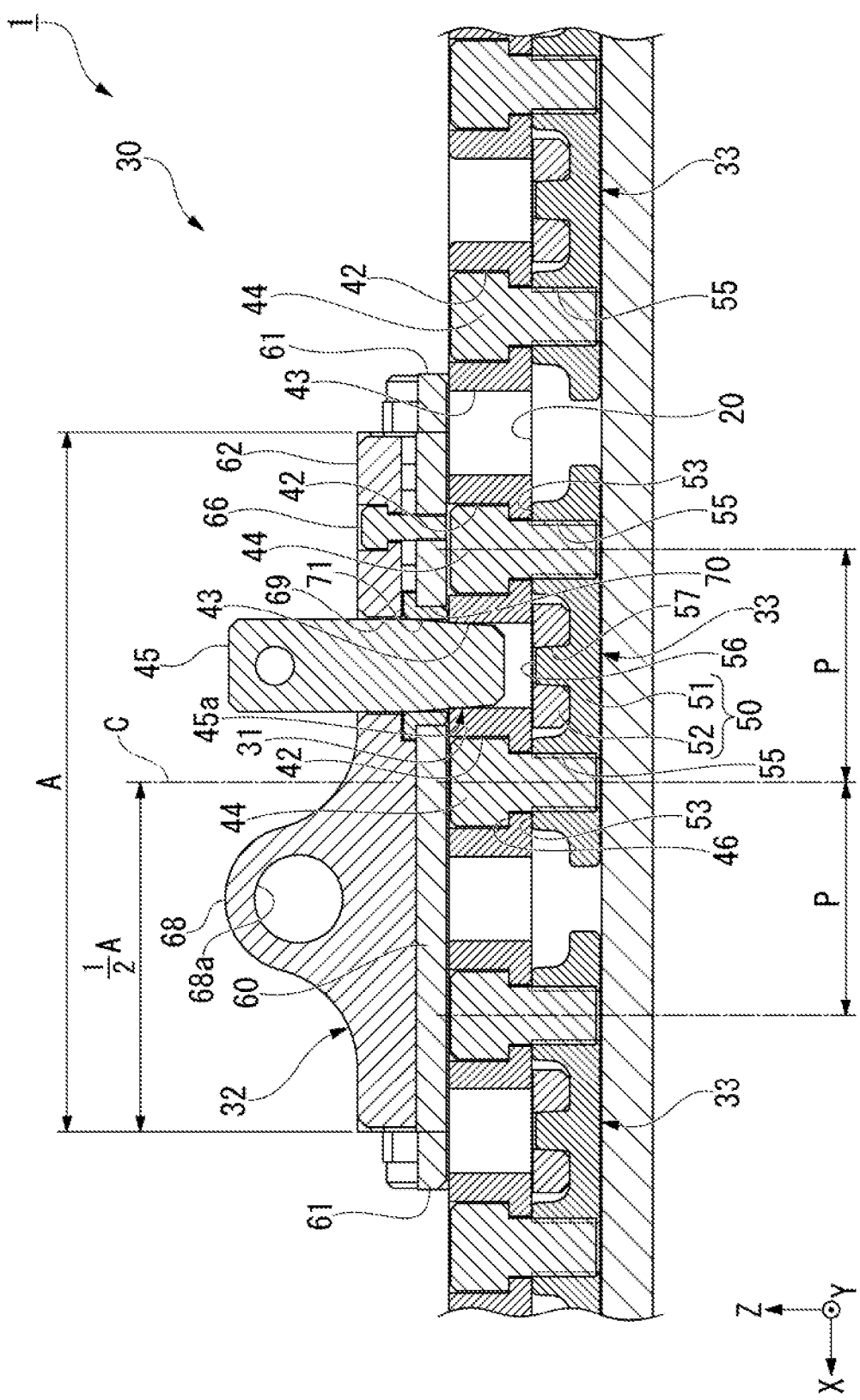
FIG. 4 is a cross-sectional view taken along line B-B shown in FIG. 2.

FIG. 1 is a perspective view showing a passenger seat moving and fixing device 1 (a guided object moving and fixing device) according to an embodiment of the present invention. FIG. 2 is a perspective view showing a linear movement guide device 30 provided in the passenger seat moving and fixing device 1 shown in FIG. 1. Also, FIG. 2 is a perspective view of the linear movement guide device 30 attached to a rear leg 17 of the passenger seat 10 as viewed from the rear. FIG. 3 is a partial cross-sectional view taken along line A-A shown in FIG. 2. FIG. 4 is a cross-sectional view taken along line B-B shown in FIG. 2.

As shown in FIG. 1, the passenger seat moving and fixing device 1 includes a passenger seat 10 (a guided object), a base member 20, and a linear movement guide device 30.

Also, in the following description, an XYZ orthogonal coordinate system may be set, and positional relations between respective members may be described with reference to this XYZ orthogonal coordinate system. The X-axis direction is a longitudinal direction of the passenger seat 10. The Y-axis direction (horizontal direction) orthogonal to the X-axis direction is a lateral direction of the passenger seat 10. The Z-axis direction orthogonal to the X and Y-axis directions is a vertical direction of the passenger seat 10.

The passenger seat 10 is, for example, an aircraft seat having a plurality of seats 11. The seat 11 includes a seating section 12 on which a person is seated, a backrest 13 which supports the seated person sitting on the seating section 12 from behind, and armrests 14 which support the seated person's arms from below. These seats 11 are integrated in the lateral direction by a seat base (a seat frame) (not shown) so as to seat three passengers.

The seat base is provided with a plurality of legs 15 for supporting the seats 11.

The plurality of legs 15 are separately disposed on left and right sides of the passenger seat 10. On the left and right sides of the passenger seat 10, the plurality of legs 15 are separately disposed at the front and back of the passenger seat 10, respectively, to be used as front legs 16 and rear legs 17. The front legs 16 extend downward from a lower surface of the seat 11. The rear legs 17 extend obliquely rearward from the lower surface of the seat 11. A slider block 32 of the linear movement guide device 30 is connected to each of a lower end of the front leg 16 and a lower end of the rear leg 17.

(Base Member)

The base member 20 is provided, for example, to extend in the longitudinal direction of the passenger seat 10 along a floor of a cabin of an aircraft. A pair of base members 20 extend in parallel at positions where the left and right front legs 16 and rear legs 17 of the passenger seat 10 are respectively disposed. As shown in FIG. 2, the base member 20 is formed in an elongated and tubular shape in which a slit 21 is formed at an upper portion thereof along the longitudinal direction (X-axis direction). That is, in the cross-sectional view orthogonal to the longitudinal direction shown in FIG. 3, the base member 20 is formed with an internal space S and the slit 21 which communicates the internal space S with the outside of the base member 20.

In the illustrated example, the internal space S extends from a lower end of the slit 21 to both sides in the lateral direction, and a generally T-shaped space is formed in the base member 20. The present embodiment is not limited to this, and for example, the internal space S may extend from the lower end of the slit 21 to one side in the lateral direction, and a generally L-shaped space may be formed in the base member 20.

Also, in the present embodiment, although the linear movement guide device 30 is disposed above the base member 20, the linear movement guide device 30 may be disposed at a side of the base member 20, for example. In this case, the slit 21 may be formed on a side surface of the base member 20.

In addition, as shown in FIG. 2, the slit 21 has a plurality of bulging regions 22 at regular intervals in the longitudinal direction, in which a width of a gap thereof in the lateral direction (Y-axis direction) intersecting the longitudinal direction is set to be wider.

(Linear Movement Guide Device)

The linear movement guide device 30 includes a track rail 31 (a track body) disposed on the base member 20, the slider block 32 (a movable body) assembled so as to be relatively movable along the track rail 31, and a securing unit 33 for attaching the track rail 31 to the base member 20. As shown in FIG. 1, the linear movement guide devices 30 are disposed to be separated in the lateral direction of the passenger seat 10. The track rails 31 of the left and right linear movement guide devices 30 extend in the longitudinal direction so as to be parallel to each other. The slider block 32 connected to the front leg 16 and the slider block 32 connected to the rear leg 17 are attached to the left and right track rails 31 so as to be relatively movable in the longitudinal direction.

(Track Rail)

The track rail 31 is an elongated member having a substantially rectangular shape in a cross-sectional view as shown in FIG. 3. On an outer surface 31b of the track rail 31 in the lateral direction (Y-axis direction) intersecting the longitudinal direction, a rolling body rolling groove 40 is formed along the longitudinal direction (X-axis direction) of the track rail 31. The rolling body rolling groove 40 is recessed in a substantially arc shape with respect to the outer surface 31b. A pair of rolling body rolling grooves 40 are formed on the left and right sides of the track rail 31.

A recess 41 is formed on the outer surface 31b of the track rail 31 below the rolling body rolling groove 40. The recess 41 is a groove larger and deeper than the rolling body rolling groove 40. The recess 41 is formed in the longitudinal direction of the track rail 31. The recess 41 is recessed in a substantially right-triangle shape in which the oblique side extends obliquely downward toward the center of the track rail 31 with respect to the outer surface 31b. A pair of recesses 41 are formed on the left and right sides of the track rail 31.

As shown in FIG. 2, a plurality of securing holes 42 and a plurality of positioning holes 43 are formed in the track rail 31. Bolts 44 (fixing members) for fixing the track rail 31 to the base member 20 are respectively inserted into the plurality of securing holes 42. That is, the plurality of securing holes 42 are used to fix the track rail 31 to the base member 20.

Positioning pins 45 for determining a longitudinal position of the slider block 32 with respect to the track rail 31 are inserted into the plurality of positioning holes 43. The positioning pin 45 restricts the relative movement of the slider block 32 and the track rail 31 in the longitudinal direction. The securing holes 42 and the positioning holes 43 are alternately formed at equal intervals in the longitudinal direction of the track rail 31.

As shown in FIG. 4, the securing hole 42 is a stepped hole which passes through the track rail 31 in a thickness direction thereof (Z-axis direction). A counterbore 46 at which a head of the bolt 44 is positioned lower than an upper surface of the track rail 31 is formed at an upper portion of the securing hole 42. The positioning hole 43 is a through hole that passes through the track rail 31 in the thickness direction. An inner diameter of the positioning hole 43 is substantially equal to an inner diameter of the counterbore 46 in the securing hole 42. The positioning hole 43 may be a bottomed cylindrical hole. Also, the inner diameters of the counterbore 46 and the positioning holes 43 may be different from each other.

(Securing Unit)

The securing unit 33 includes an inner attachment member 50 disposed in the inner space S of the base member 20. The inner attachment member 50 includes a first member 51, in which a plurality of (two in the present embodiment) bolt fastening portions 53 are connected at intervals in the longitudinal direction, and a second member 52 for restricting movement of the first member 51 in the longitudinal direction between the plurality of bolt fastening portions 53. The first member 51 is fastened with a plurality of bolts 44 and sandwiches the base member 20 from the inside and the outside between itself and the track rail 31 disposed outside the base member 20 as shown in FIG. 3.

As shown in FIG. 3, the first member 51 includes a holding portion 54 for sandwiching the base member 20 between itself and the track rail 31 and a bolt fastening portion 53 protruding upward from the holding portion 54. In the lateral direction, a width of the holding portion 54 is smaller than the width of the bulging region 22 of the slit 21 and is larger than a width of a region (narrowing region) other than the bulging region 22 of the slit 21. The holding portion 54 and the bolt fastening portion 53 are disposed between the bulging regions 22 adjacent to each other in the longitudinal direction (narrowing region). As shown in FIG. 4, a screw hole 55 extending in the vertical direction is formed in the bolt fastening portion 53, and a bolt 44 is fastened to the bolt fastening portion 53. The screw hole 55 opens in an upper surface of the bolt fastening portion 53.

The first member 51 is provided with a projection 56 for fixing the second member 52 between the bolt fastening portions 53 disposed adjacent to each other in the longitudinal direction. The second member 52 includes a securing hole 57, into which the protrusion 56 is press-fitted, and is fixed to the first member 51. The second member 52 has a substantially oval shape that is elongated in the lateral direction (Y-axis direction) in a top view. The second member 52 is disposed in the bulging region 22 shown in FIG. 2 and engages with an inner surface of the slit 21 forming the bulging region 22 in the longitudinal direction (X-axis direction), thereby restricting the movement of the first member 51 in the longitudinal direction.

(Slider Block)

As shown in FIG. 2, the slider block 32 includes a block main body 60, end plates 61 (lids) attached to the block main body 60, and an adapter plate 62 (an attachment member) to which the legs 15 of the passenger seat 10 are attached. As shown in FIG. 3, the block main body 60 is formed with a protrusion 63 which is loosely fitted in the recess 41 of the track rail 31. The protrusion 63 protrudes with respect to an inner surface 60b of the block main body 60 and is inserted into the recess 41 having a gap therebetween.

By inserting the protrusion 63 into the recess 41, the track rail 31 and the slider block 32 cannot be separated in the Z-axis direction. For this reason, for example, even when an external load (extraction load) in a direction relatively moving the slider block 32 away from the track rail 31 (direction including the Z component) is applied to the slider block 32 connected to the leg 15, the contact between the recess 41 and the protrusion 63 maintains the assembled state of the track rail 31 and the slider block 32 and prevents balls 64 from falling off or the like.

Further, a rolling body load rolling groove 65 is formed in the block main body 60. The rolling body load rolling groove 65 is recessed in an arc shape with respect to the inner surface 60b of the block main body 60. A pair of rolling body load rolling grooves 65 are formed on the left and right sides of the slider block 32 so as to sandwich the track rail 31. The rolling body load rolling groove 65 faces the rolling body rolling groove 40 of the track rail 31 and forms a load rolling body rolling path L1 which causes the balls 64 to roll in a loaded state.

Further, in the block main body 60, a no-load rolling body rolling path L2 is formed. The no-load rolling body rolling path L2 is formed to pass through the block main body 60 in the longitudinal direction. An inner diameter of the no-load rolling body rolling path L2 is larger than a ball diameter of the ball 64, and the ball 64 is configured to not be loaded. A pair of no-load rolling body rolling paths L2 are formed on the left and right sides of the slider block 32 corresponding to the rolling body load rolling groove 65 (the load rolling body rolling path L1).

The end plates 61 are attached to both end faces in a moving direction of the block main body 60, as shown in FIG. 2. In the end plates 61, rolling body direction change paths L3 are formed in opposing surfaces opposed to both end surfaces of the block main body 60 (see FIG. 3). A pair of rolling body direction change paths L3 connect the both ends of the load rolling body rolling path L1 and the no-load rolling body rolling path L2, respectively, to form an infinite circulation path L of the balls 64.

The infinite circulation path L is configured by a pair of linear portions (the loaded rolling body rolling path L1 and the no-load rolling body rolling path L2) extending in the longitudinal direction of the track rail 31 and a pair of semicircular curved portions (rolling body direction change paths L3) which connect ends of the pair of linear portions. In the present embodiment, two infinite circulation paths L are formed so as to be spaced in the lateral direction of the track rail 31 and extend in parallel along the longitudinal direction of the track rail 31.

The ball 64 is interposed between the track rail 31 and the slider block 32 to facilitate a smooth movement of the slider block 32 relative to the track rail 31. The ball 64 of the present embodiment is disposed substantially without a gap inside the infinite circulation path L and circulates through the infinite circulation path L.

The adapter plate 62 is fixed to the top of the block main body 60 using a plurality of bolts 66 (screw members) as shown in FIG. 2. The adapter plate 62 includes a rocker bearing part 68 having an attachment hole 68a extending in the lateral direction (Y direction). A rocker shaft 67 is inserted into the attachment hole 68a in such a manner that it can rock relative to the attachment hole 68a. The rocker shaft 67 integrally passes through a connecting hole (not shown) provided in the leg 15 (rear leg 17) and the attachment hole 68a, thereby connecting the passenger seat 10 to the rocker bearing part 68.

The adapter plate 62 is formed with an insertion hole 69 through which the positioning pin 45 is inserted. The insertion hole 69 passes through the adapter plate 62 in the thickness direction (Z-axis direction). As shown in FIG. 4, an insertion hole 70 communicating with the insertion hole 69 is formed in the block main body 60. The insertion hole 70 passes through the block main body 60 in the thickness direction (Z-axis direction). A bush 71 having a flanged cylindrical shape is attached to the insertion hole 70.

Assuming that a length of the block main body 60 in the longitudinal direction is A, a center line C of the block main body 60 in the longitudinal direction is positioned at a position separated by ½×A in the longitudinal direction away from a front end or a rear end of the block main body 60. A central axis of the attachment hole 68a and a central axis of the insertion hole 69 are disposed at positions that avoid the center line C. That is, the central axis of the attachment hole 68a and the central axis of the insertion hole 69 are disposed at a position away from the center in the longitudinal direction of the block main body 60. Further, the central axis of the attachment hole 68a is disposed on the front side of the center line C (one end side of the slider block 32), and the central axis of the insertion hole 69 is disposed on the rear side of the center line C (the other end side of the slider block 32).

The central axis of the insertion hole 69 is positioned between the securing holes 42 adjacent to each other in the longitudinal direction. Further, the central axis of the attachment hole 68a is positioned between the securing holes 42 adjacent to each other in the longitudinal direction, which is different from between the securing holes 42 at which the central axis of the insertion hole 69 is positioned.

In the track rail 31, assuming that the distance between the center lines of the adjacent securing holes 42 in the longitudinal direction is P, A>2×P. That is, the length A of the block main body 60 in the longitudinal direction is longer than the distance between the center lines of the securing holes 42 positioned at both ends in the longitudinal direction among the three securing holes 42 arranged in series. In the longitudinal direction, the block main body 60 is disposed across at least three securing holes 42.

(Positioning Pin)

The positioning pin 45 has a tapered portion 45a tapered toward its tip and has a configuration that can be easily inserted into the insertion hole 69 of the adapter plate 62, the insertion hole 70 (bush 71) of the block main body 60, and the positioning hole 43 of the track rail 31. When the positioning pin 45 is inserted into the positioning hole 43 of the track rail 31 through the adapter plate 62 and the block main body 60, the longitudinal position of the slider block 32 with respect to the track rail 31 is determined.

(Operation)

According to the linear movement guide device 30 having the above configuration, by inserting and removing the positioning pin 45, positioning (fixing) and releasing (releasing the fixation) in the longitudinal direction of the slider block 32 with respect to the track rail 31 can be performed. For this reason, if the positioning pin 45 is removed from the slider block 32, the passenger seat 10 shown in FIG. 1 can be easily moved in the longitudinal direction. Also, by inserting the positioning pin 45 into the slider block 32 and inserting it into the positioning hole 43 of the track rail 31, the passenger seat 10 can be fixed.

When this linear movement guide device 30 is attached to the base member 20 of equipment that has been installed in an aircraft or the like, it may be difficult to secure robustness by increasing the size of the bolt 44 or the like. In particular, when the slider block 32 is connected to the rear leg 17 of the passenger seat 10 for aircraft, it is required that the bolt 44 does not come out of the screw hole 55 of the bolt fastening portion 53 even if a large force directed upward (+Z direction) and forward (+X direction) acts on the rocker bearing part 68. Further, the load acting on the rocker bearing part 68 tends to be concentrated as a tensile load on the bolt 44 in the portion where the slider block 32 straddles in the longitudinal direction. Then, in order to prevent the bolt 44 from coming out of the screw hole 55 while suppressing an increase of the size of the bolt 44, each component should be arranged so that the upward tensile load acting on each bolt 44 is even.

Therefore, in the following description, the relation between the arrangement of each component in the longitudinal direction and the tensile load which acts on each bolt 44 will be explained using FIGS. 5A and 5B.

Figure 5A:
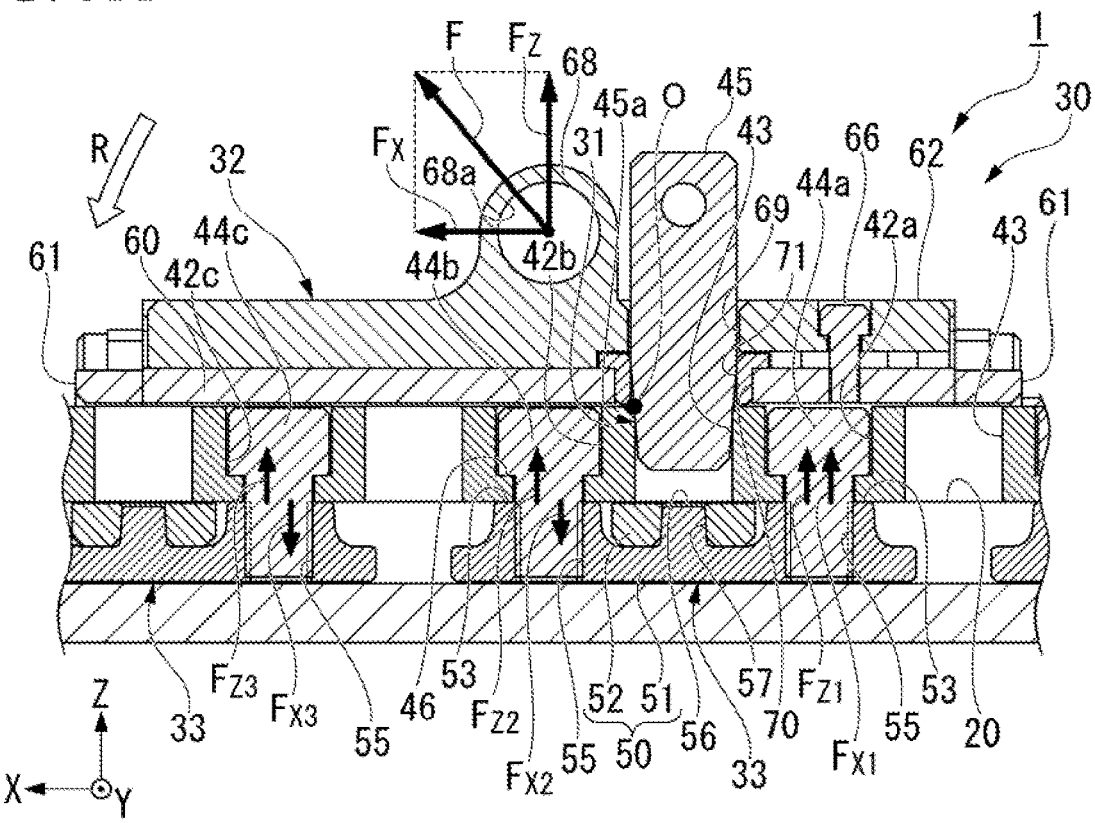
FIG. 5A is a schematic diagram for explaining a tensile load acting on a bolt which shows a case where an attachment hole is disposed at substantially the same position as a securing hole in a longitudinal direction thereof.
Figure 5B:
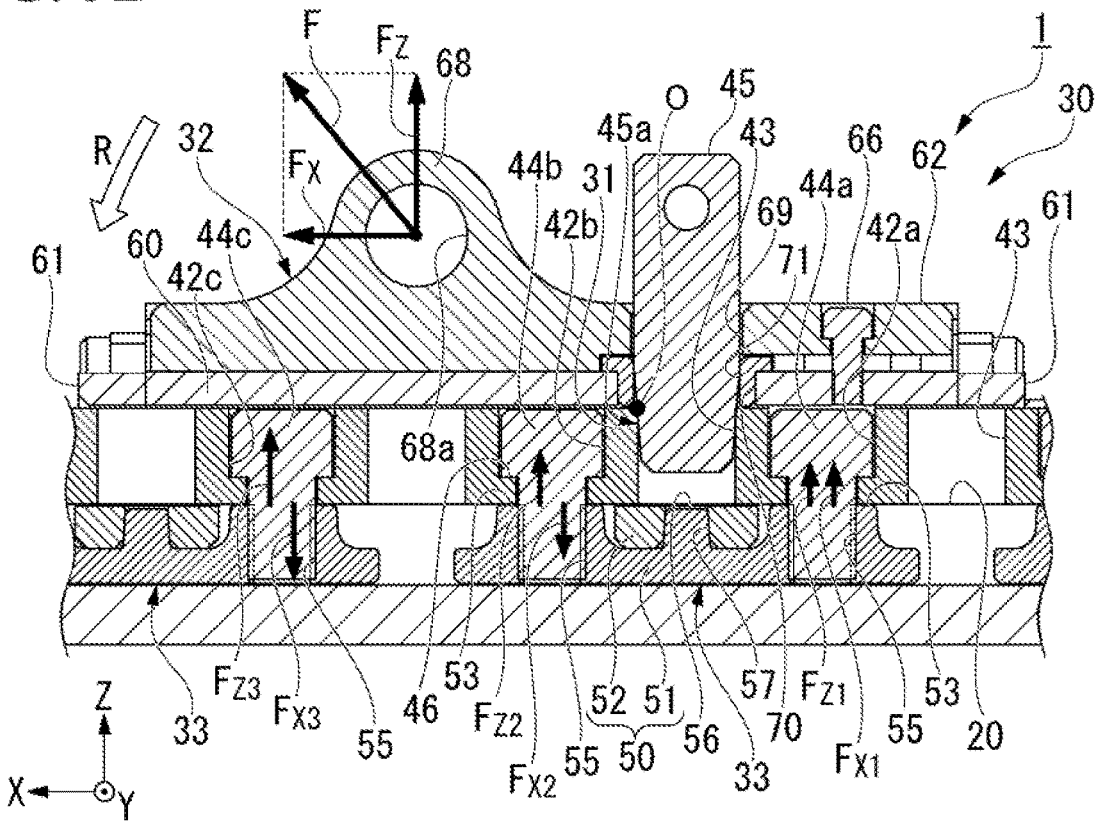
FIG. 5B is a schematic diagram for explaining a tensile load acting on a bolt which shows a case where an attachment hole is disposed between securing holes in the longitudinal direction.

FIGS. 5A and 5B are schematic diagrams showing the configuration of the linear guide device 30. In the following description, among the securing holes 42 in each drawing, the one positioned at the rearmost side (−X side) is referred to as a first securing hole 42a, and the one positioned at the front side (+X side) is referred to as a third securing hole 42c, and the one positioned between the first securing hole 42a and the third securing hole 42c is referred to as a second securing hole 42b. Also, the bolts 44 positioned in the securing holes 42a to 42c are respectively referred to as a first bolt 44a (first fixing member), a second bolt 44b (second fixing member), and a third bolt 44c (third fixing member).

Also, the slider block 32 is disposed across the first securing hole 42a to the third securing hole 42c in the longitudinal direction. Thus, even if another bolt 44 exists behind the first securing hole 42a or in front of the third securing hole 42c, the load acting on the slider block 32 is mainly received by the first to third bolts 44a to 44c.

In FIGS. 5A and 5B, the arrangement of the attachment holes 68a in the slider block 32 in the longitudinal direction is different, but the other configurations are equivalent to each other. Specifically, in FIG. 5A, the attachment hole 68a is disposed at the center of the slider block 32 in the longitudinal direction and is at the same position as the second securing hole 42b. In FIG. 5B, the attachment hole 68a is disposed between the center and the front end of the slider block 32 in the longitudinal direction and is positioned between the second securing hole 42b and the third securing hole 42c.

The disposition of the insertion hole 69 and the positioning pin 45 is the same in FIGS. 5A and 5B and is positioned between the center and the rear end in the longitudinal direction of the slider block 32. Also, the insertion hole 69 and the positioning pin 45 are positioned between the first securing hole 42a and the second securing hole 42b in the longitudinal direction.

When the load F shown in FIGS. 5A and 5B acts on the rocker bearing part 68, the load F can be decomposed into a component force $F_Z$ in the vertical direction and a component force $F_X$ in the longitudinal direction.

The component force $F_Z$ in the vertical direction is transmitted to the track rail 31 via a fixing portion between the adapter plate 62 and the block main body 60 and a loosely fitted portion between the protrusion 63 and the recess 41 (see FIG. 3). Further, the track rail 31 is attached to the inner attachment member 50 and the base member 20 using bolts 44. Thus, when an upward load is applied to the slider block 32, an upward tensile load is applied to each of the bolts 44a to 44c.

The component force $F_X$ in the longitudinal direction acts as a moment that causes the slider block 32 to rotate in the direction of the arrow R about a contact point O on the front side of the positioning pin 45 and the positioning hole 43. Also, the direction of the arrow R is a direction that rotates such that a portion on the front side of the contact point O of the slider block 32 moves downward and a portion on the rear side of the contact point O moves upward. This moment acts as a downward load on the bolt 44 positioned on the front side of the contact point O and acts as an upward load on the bolt 44 positioned on the rear side of the contact point O. Also, magnitudes of these upward/downward loads increase as the acting point moves away from the contact point O in the longitudinal direction.

Here, from the viewpoint of evenly receiving the component force $F_Z$ in the vertical direction, it might be preferably that the central axis of the attachment hole 68a is disposed immediately above the second bolt 44b as shown in FIG. 5A. In this case, upward loads $F_{Z1}$ to $F_{Z3}$ received by the first to third bolts 44a to 44c due to the component force $F_Z$ in the vertical direction are substantially equal.

However, the vertical load due to the component force $F_X$ in the longitudinal direction is different among the first bolt 44a to the third bolt 44c. Specifically, a relatively large upward load $F_{X1}$ caused by the component force $F_X$ acts on the first bolt 44a. A relatively small upward load $F_{X2}$ acts on the second bolt 44b due to the component force $F_X$. On the other hand, a relatively large downward load $F_{X3}$ caused by the component force $F_X$ acts on the third bolt 44c.

Thus, in the arrangement of FIG. 5A, since both the upward load $F_{Z1}$ caused by the component force $F_Z$ and the upward load $F_{X1}$ caused by the component force $F_X$ act on the first bolt 44a in the same direction, a large tensile load ($F_{Z1}+F_{X1}$) acts on the first bolt 44a. On the contrary, in the third bolt 44c, since the downward load $F_{X3}$ caused by the component force $F_X$ acts to cancel the upward load $F_{Z3}$ caused by the component force $F_Z$, the tensile load ($F_{Z3}-F_{X3}$) acting on the third bolt 44c decreases. Thus, in the arrangement of FIG. 5A, since the tensile load acting on each of the bolts 44a to 44c becomes uneven and the tensile load concentrates on the first bolt 44a, it is difficult to ensure robustness.

On the other hand, in the arrangement shown in FIG. 5B, the central axis of the attachment hole 68a is positioned between the second bolt 44b and the third bolt 44c in the longitudinal direction. Thus, the upward load caused by the component force $F_Z$ is the largest at the third bolt 44c, and decreases in the order of the second bolt 44b and the first bolt 44a. That is, the relationship of $F_{Z3}>F_{Z2}>F_{Z1}$ is obtained.

On the other hand, a downward load due to the component force $F_X$ acts on the third bolt 44c and the second bolt 44b. Further, the downward load is greater for the third bolt 44c than for the second bolt 44b. That is, $F_{X3}>F_{X2}$. In addition, a relatively small upward load $F_{X1}$ due to the component force $F_X$ acts on the first bolt 44a.

Thus, although a relatively large upward load $F_{Z3}$ caused by the component force $F_Z$ acts on the third bolt 44c, a relatively large downward load $F_{X3}$ caused by the component force $F_X$ acts so as to cancel this. For this reason, the overall tensile load ($F_{Z3}-F_{X3}$) can be suppressed. Similarly, a downward load $F_{X2}$ acts on the second bolt 44b so as to cancel the upward load $F_{Z2}$. For this reason, the overall tensile load ($F_{Z2}-F_{X2}$) can be suppressed. Further, although the upward loads $F_{Z1}$ and $F_{X1}$ caused by both of the component force $F_Z$ and the component force $F_X$ act on the first bolt 44a, these loads are relatively small. For this reason, the overall tensile load ($F_{Z1}+F_{X1}$) can be suppressed to be small.

As described above, by arranging the central axis of the attachment hole 68a at a position avoiding the center in the longitudinal direction of the slider block 32, when a large load directed forward and upward acts on the attachment hole 68a, it is possible to prevent the tensile load acting on each bolt 44 from becoming uneven.

Further, the central axis of the attachment hole 68a is positioned between the securing holes 42 adjacent to each other in the longitudinal direction, which is different from being positioned between the securing holes 42 where the central axes of the insertion holes 69 are positioned, the tensile load acting on each bolt 44 can be made uniform and kept small. Thus, the robustness of the linear guide device 30 can be secured while suppressing the size of the bolt 44.

In particular, when the rocker bearing part 68 is connected to the rear leg 17 of the passenger seat 10 for an aircraft via the rocker shaft 67, the rocker bearing part 68 is required to bear a large load forward and upward as mentioned above. Accordingly, in the present embodiment, the effect of suppressing the tensile load acting on the bolt 44 is significantly exhibited.

As mentioned above, although the suitable embodiment of the present invention has been described with reference to the drawings, the present invention is not limited to the above-mentioned embodiment. It should be understood that the shapes, combinations, and the like of the constituent members shown in the above-described embodiment are merely examples, and various changes can be made based on design requirements and the like without departing from the scope of the present invention.

For example, in the above embodiment, although the passenger seat 10 for an aircraft has been illustrated as the guided object of the linear movement guide device 30, the embodiment of the present invention is not limited to this configuration, and it may be used to attach other guided objects to the base member 20.

In addition, in the above embodiment, although the slider block 32 has been illustrated to be straddled in the longitudinal direction to the three securing holes 42 arranged in series, the embodiment of the present invention is not limited to this structure. For example, the slider block 32 straddling four or more securing holes 42 in the longitudinal direction may be employed. Even in this case, by arranging the central axis of the attachment hole 68a at a position away from the center in the longitudinal direction of the slider block 32, the above-described effects can be obtained.

Further, for example, in the above embodiment, as shown in FIG. 3, a linear movement guide device in which a total of two infinite circulation paths L that are formed on both left and right sides are formed has been described as the linear movement guide device 30, a system may be used in which a total of four infinite circulation paths L are formed, two on each side, for example. In addition, as long as the movement stroke of the guided object is limited, a finite stroke type linear movement guide device in which the infinite circulation path L is not formed may be used as the linear movement guide device 30. In this finite stroke type linear movement guide device, a cage (a rolling body holding member) is disposed between the rolling body rolling groove 40 and the rolling body load rolling groove 65, and a ball holder provided on the cage holds the ball 64 rotatably.

Also, for example, although balls are used as the rolling bodies in the above embodiment, other rolling bodies such as rollers may be used, for example.

INDUSTRIAL APPLICABILITY

According to the linear movement guide device described above, it is possible to easily change the position in the longitudinal direction of the guiding object, and it is possible to obtain a linear movement guide device capable of securing robustness.

REFERENCE SIGNS LIST

1 Seat moving and fixing device
10 Passenger seat (guided object)
15 Leg
20 Base member
21 Slit
30 Linear movement guide device
31 Track rail (track body)
32 Slider block (movable body)
42 Securing hole
45 Positioning pin
64 Ball (Rolling body)
67 Rocker shaft
68 Rocker bearing part
68a Attachment hole
69 Insertion hole
S Internal space

The invention claimed is:

1. A linear movement guide device comprising:
a track rail;
a movable body which is attached to the track rail so as to be capable of movement relative thereto via a plurality of rolling bodies; and
a positioning pin which restricts the relative movement between the movable body and the track rail,
wherein the track rail is provided with a plurality of securing holes configured to fix the track rail to a base member, which are disposed at predetermined intervals in a longitudinal direction thereof, and a positioning hole into which the positioning pin is inserted,
the movable body is provided with a rocker bearing part having an attachment hole into which a rocker shaft configured to rockably connect a guided object is inserted, and an insertion hole into which the positioning pin is inserted, and
the attachment hole and the insertion hole are disposed at positions that avoid a center of the movable body in the longitudinal direction.

2. The linear movement guide device according to claim 1,
wherein a length of the movable body in the longitudinal direction is longer than a distance between central axes of the securing holes that are positioned at both ends in the longitudinal direction among three securing holes disposed in series, and
a central axis of the insertion hole is positioned between the securing holes adjacent to each other in the longitudinal direction.

3. The linear movement guide device according to claim 2, wherein a central axis of the attachment hole is positioned between the securing holes adjacent to each other in the longitudinal direction, which is different from being positioned between the securing holes where the central axis of the insertion hole is positioned.

4. The linear movement guide device according to claim 1,
wherein, when viewed in a cross-sectional view perpendicular to the longitudinal direction, an internal space and a slit which communicates the internal space with an outside of the base member are formed in the base member, and
the track rail is attached to the base member via an inner attachment member disposed in the internal space.

5. The linear movement guide device according to claim 1, wherein the rocker bearing part is connected to a rear leg of a passenger seat for an aircraft via the rocker shaft.

* * * * *